Jan. 9, 1923. 1,441,502.
H. C. HOOK.
BROACH.
FILED AUG. 13, 1920.

Inventor:
HENRY C. HOOK
By
B. D. Watts
Attorney.

Patented Jan. 9, 1923.

1,441,502

UNITED STATES PATENT OFFICE.

HENRY C. HOOK, OF DETROIT, MICHIGAN, ASSIGNOR, BY MESNE ASSIGNMENTS, TO ALUMINUM MANUFACTURES, INCORPORATED, OF CLEVELAND, OHIO, A CORPORATION OF DELAWARE.

BROACH.

Application filed August 13, 1920. Serial No. 403,429.

*To all whom it may concern:*

Be it known that I, HENRY C. HOOK, a citizen of the United States, residing at Detroit, in the county of Wayne, State of Michigan, have invented a certain new and useful Improvement in Broaches, of which the following is a specification, reference being had therein to the accompanying drawings.

This invention relates to a tool for broaching the surface of tubular bodies such, for example, as bearing bushings.

One object of the invention is to provide such a broaching tool with cutters so constructed and related to each other as to produce an improved bearing surface.

Another object of the invention is to provide a broaching tool having, in connection with the broaching cutters, burnishing devices of improved form and arrangement.

A preferred embodiment of the invention is shown in the accompanying drawings in which—

Figures 1, 2:
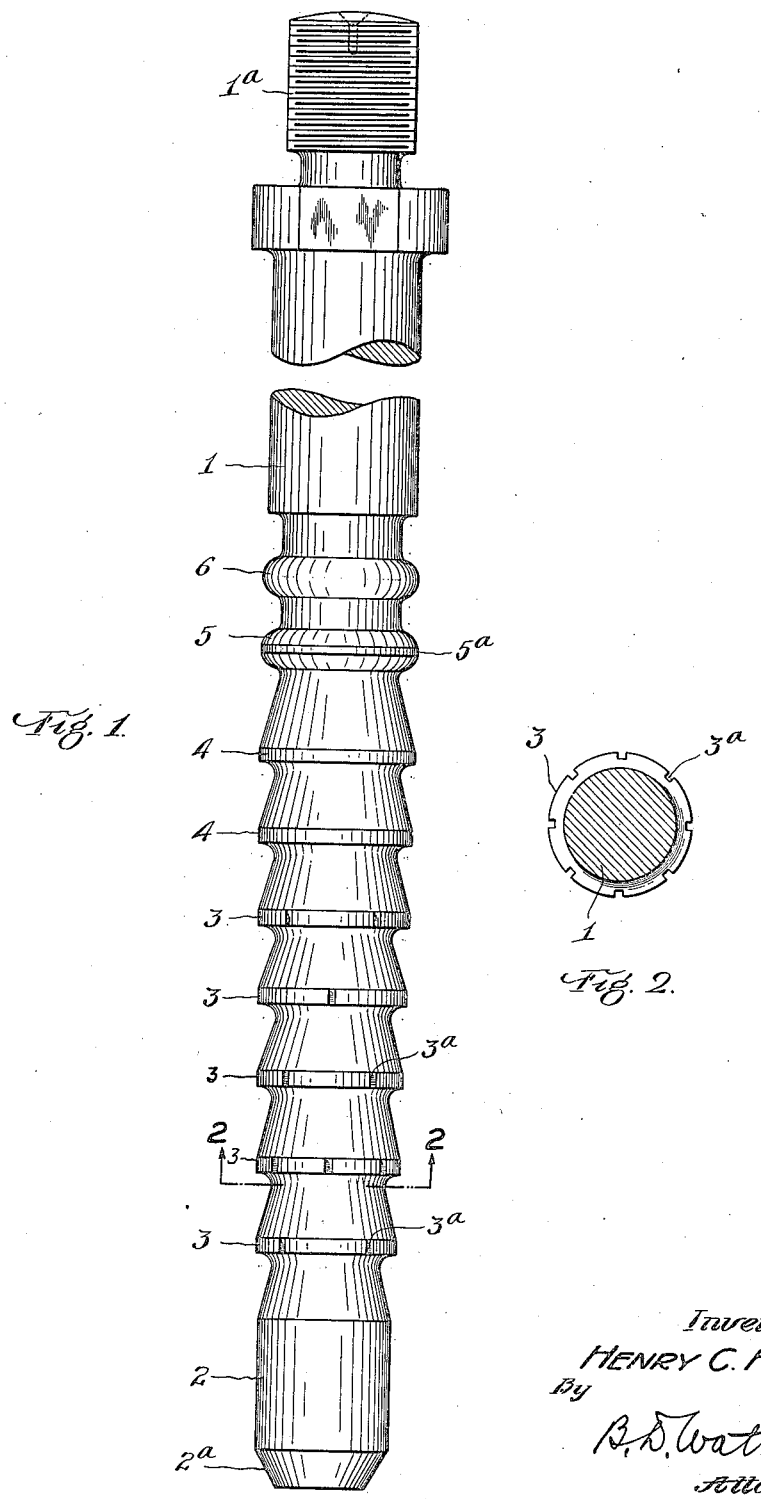
Fig. 1 is a side elevation of one of my improved broaching tools adapted for the broaching of bronze bushings.
Fig. 2 is a cross section on the line 2—2, Fig. 1.

As shown in the drawing the broach comprises a shank 1 which is threaded at 1ª for attachment to the plunger of a press, or other suitable machine part.

At its lower end the broach is formed with a pilot section 2, which is beveled at 2ª to guide the broach into the work. Above the pilot the broach is formed with a series of preliminary, or roughing cutters, 3, 3, and above them a plurality of finishing cutters 4. I preferably provide five or more of the roughing cutters 3, and two or more of the finishing cutters 4. Each of the cutters 3 is formed with a circumferential series of notches 3ª which serve to break the chip or shaving into a number of parts and obviate clogging of the cutters.

Above the finishing cutters I form the broach with a plurality of burnishing rings 5, 6. Preferably the lowest burnisher adjacent to the last of the cutters is formed with a flat or, cylindrical surface, 5ª while the burnisher 6 is formed simply with a rounded surface.

The diameter of the pilot section 2 is made such as to fit the bore of the tube, or bushing, to be roached. The roughing cutters 3 are of such diameters that they remove about 90% of the metal removed in the broaching operations. In other words the cutters 3 take comparatively heavy cuts from the bushing while the finishing cutters 4 make very light cuts. This is a feature which I have found to be of much importance as it results in a superior bearing surface as compared with prior broaching practice known to me. Where bronze bushings are cast in sand, it is necessary to remove a considerable amount of the surface metal to insure a good bearing surface, and I have found that where heavy broaching cuts are made the grains or crystals of the metal are so torn and distorted as to injure the bearing quality of the metal. With my improved broach I have overcome this difficulty, first, by providing a relatively large number of roughing cutters (preferably five or more) so that the depth of each individual cut is reduced and, second, by following the roughing cutters with a plurality of finishing cutters that make light cuts. By making a plurality of light finishing cuts I insure the removal of the surface metal with crystals or grains distorted by the roughing cuts, and obtain the best possible bearing surface.

As is well understood, the function of the burnishers 5 and 6 is to compact and smooth the metal so as to further enhance its bearing quality. By forming the first burnisher, 5, which follows the last finishing cutter with a flattened or cylindrical surface, I have materially increased the life of the broach. Apparently this form of burnisher is better adapted than is a rounded burnisher to operate upon the slightly rough surface left by the cutters without undergoing undue wear. After the preliminary burnishing action of the burnisher 5, the rounded burnisher 6, operates satisfactorily without undue wear and produces a highly satisfactory bearing surface.

It will be understood that the relative diameters of the pilot, cutter and burnisher parts of the broach, as well as their longitudinal spacing will vary with the diameter and length of the bushing to be broached, but in order that my invention may be quite clearly understood, some dimensions may be given by way of example.

First example: Diameter of pilot section, 1.135″; diameter of first (lowermost) roughing cutter, 1.150″; diameter of the second roughing cutter, 1.165"; diameter of the third roughing cutter, 1.175"; diameter of fourth roughing cutter, 1.182"; diameter of fifth roughing cutter, 1.185"; diameter of first finishing cutter, 1.1865"; diameter of second finishing cutter, 1.1875"; diameter of the first burnisher (5), 1.1885"; diameter of second burnisher (6) 1.1890". It will be seen that the roughing cutters 3 of this broach are adapted to remove about 90% of the metal removed.

Second example: Diameter of pilot section, 2.450"; diameter of first roughing cutter, 2.470"; diameter of second roughing cutter, 2.485"; diameter of the third roughing cutter, 2.493"; diameter of fourth roughing cutter, 2.497"; diameter of fifth roughing cutter, 2.499"; diameter of the first finishing cutter, 2.500"; diameter of second finishing cutter, 2.501"; diameter of first burnisher 2.502"; diameter of second burnisher, 2.5025". In case of this broach the roughing cutters remove about 90% of the metal removed.

The spacing of the cutters longitudinally of the broach will vary more or less with the length of the bushing to be broached. Preferably the distance between cutters will be made less than one half the length of the bushing so that, after the pilot has left the bushing, and before the burnishers have entered, there will never be less than two cutters in the work.

As will be readily understood from the foregoing, various changes as to the relative dimensions, and number of cutters and burnishers, can be made without departing from my invention. The construction shown in the drawing, and the foregoing examples are given by way of illustration and for explanation the scope of the invention being indicated by appended claims.

What I claim is:

1. A broach for forming bearing surfaces on bushings, having roughing cutters adapted to remove approximately 90% of the metal to be removed from the bushing, finishing cutters adapted to remove substantially all the remainder of the metal to be removed and annular beads adapted to completely finish the bearing surfaces of the bushing, the bead adjacent the finishing cutters having a flattened face and the bead remote from the finishing cutters having a rounded face.

2. A broach for forming bearing surfaces on bushings having a cutter adapted to form a semi-finished surface, and means for completely finishing the bearing surface formed by the cutter, comprising an annular bead with flattened face arranged to engage and burnish the bearing surface as it is formed by the cutter, and a second bead with rounded face, arranged to engage and burnish the bearing surface as formed by the first named bead.

In testimony whereof, I hereunto affix my signature.

E. C. HOOK.